United States Patent
LePoder et al.

(10) Patent No.: US 6,379,549 B1
(45) Date of Patent: Apr. 30, 2002

(54) METHOD FOR TREATING WATER INCORPORATING A SEDIMENTATION TANK AND A MULTILAYER FILTER OPERATING AT HIGH SPEEDS

(76) Inventors: M. Nicolas LePoder, 52, rue Basse Roche, Conflans-Ste-Honorine 78700; M. Jacques Sibony, 7bis, rue du Moulin Vert, Paris 75014, both of (FR)

( * ) Notice: Subject to any disclaimer, the term of this patent is extended or adjusted under 35 U.S.C. 154(b) by 0 days.

(21) Appl. No.: 09/485,908
(22) PCT Filed: Aug. 20, 1998
(86) PCT No.: PCT/FR98/01829
§ 371 Date: Apr. 20, 2000
§ 102(e) Date: Apr. 20, 2000
(87) PCT Pub. No.: WO99/10071
PCT Pub. Date: Mar. 4, 1999

(30) Foreign Application Priority Data

Aug. 22, 1997 (FR) .............................. 97 10730

(51) Int. Cl.[7] .................................. C02F 1/52
(52) U.S. Cl. ...................... 210/631; 210/714; 210/721; 210/726; 210/727; 210/738; 210/752; 210/764; 210/794; 210/806
(58) Field of Search ................... 210/631, 712, 210/714, 721, 726, 727, 738, 752, 764, 756, 793, 794, 195.1, 199, 202, 203, 205, 265, 275, 274, 281, 290, 806

(56) References Cited

U.S. PATENT DOCUMENTS

| | | | | |
|---|---|---|---|---|
| 3,171,801 A | * | 3/1965 | Rice et al. | 210/290 |
| 3,534,855 A | * | 10/1970 | Guillerd et al. | 210/73 |
| 4,139,473 A | * | 2/1979 | Alldredge | 210/279 |
| 4,927,543 A | * | 5/1990 | Bablon et al. | 210/711 |
| 5,120,435 A | * | 6/1992 | Fink | 210/192 |
| 5,178,773 A | | 1/1993 | Kerlin et al. | 210/724 |
| 5,449,453 A | * | 9/1995 | Tang | 210/108 |
| 5,770,091 A | * | 6/1998 | Binot et al. | 210/711 |

FOREIGN PATENT DOCUMENTS

| | | |
|---|---|---|
| DE | 24 27 698 | 12/1975 |
| GB | 1 485 007 | 9/1978 |

* cited by examiner

Primary Examiner—Peter A. Hruskoci
(74) Attorney, Agent, or Firm—Coats & Bennett, P.L.L.C.

(57) ABSTRACT

The invention concerns a method for treating water to abate their content in suspended matter and, as the case may be in parasites, characterised in that it consists in causing said water to pass through at least one sedimentation tank (1) at a treatment speed higher than 20 mph then, through at least a multilayer filter with decreasing size grading (2) at a treatment speed higher than 10 mph. The sedimentation tank used is preferably a sedimentation tank with ballasted floc preferably lamellar.

21 Claims, 4 Drawing Sheets

METHOD FOR TREATING WATER INCORPORATING A SEDIMENTATION TANK AND A MULTILAYER FILTER OPERATING AT HIGH SPEEDS

This application is a 371 of PCT/FR98/01829 filed, Aug. 20, 1998.

This invention relates to the domain of water treatment.

More precisely, the invention relates to a physical or physicochemical process designed to reduce the content of suspended matter or parasites in this water, and the installation corresponding to this process.

The invention may be used to treat any water containing suspended matter when it is required to reduce the content, particularly such as:

waste water that has already been treated biologically in order to further purify it, residual water that will be reused after treatment, for example in industry or agriculture, particularly for irrigation;

water to be discharged into the sea;

previously treated waste water (biologically or by other means), in order to control the residual phosphorus content of the discharge.

As described below, the method and plant according to the invention will be particularly useful to treat suspended matter contained in water to be reused for irrigation.

There are several state-of-the-art treatment techniques for suspended matter. These techniques include:

physical sedimentation or preferably physicochemical sedimentation consisting of subjecting the water to clarification, and possibly also adding a coagulating reagent in order to increase the sedimentation capacity of the suspended matter;

filtration on a sand bed, usually between 1.5 and 2 m thick.

Treatment speeds used on conventional sedimentation tanks rarely exceed 2 to 2.5 m/h. These treatment speeds can be increased up to between 10 and 15 m/h when a lamellar type of sedimentation tank is used, and up to 20 m/h when lamellar sedimentation is combined with a coagulation-flocculation step.

In order to obtain good water quality, prior art recommends that sand beds should be used with a maximum filtration speed of 10 m/h.

Therefore, these two treatment types both have the disadvantage that they cannot be used at high speeds, which makes it necessary to use physically large plant involving expensive civil works.

The main objective of this invention is to propose a water treatment method designed to reduce the content of suspended matter and also if applicable of parasites (particularly helminth eggs) so that the structures used can be more compact than state-of-the-art plants, while obtaining a sufficient quality of the treated water to satisfy all requirements, for example for reuse as described above.

This objective is achieved according to the invention which relates to a process for the treatment of waste water in order to reduce its content of suspended matter, and possibly parasites, characterized in that it consists of passing the said water through at least one sedimentation tank at a treatment speed higher than 20 m/h and then upwards through at least one multi-layer filter with decreasing size grading at a treatment speed higher than 10 m/h.

Therefore, the invention proposes to treat the suspended matter and if applicable the parasites, by using a sedimentation tank operating at high speed (in other words a speed higher than the speed conventionally recommended by prior art for the use of this type of sedimentation tank) and a multi-layer filter with size grading decreasing in the upwards direction of the filtration flow, also operating at high speed.

As described above, there are known ways of treatment of suspended matter by sedimentation or by filtration on a sand bed. However, to the knowledge of the applicant, it has never been proposed to:

combine this type of sedimentation tank with a granular filter, particularly with a specific type of filter, namely a multi-layer filter with decreasing size grading and upwards current, or use high treatment speeds in this type of device.

Very surprisingly, the applicant found that the combined use of treatment speeds higher than speeds recommended in the state of the art both in the sedimentation tank and in the granular filter, could result in:

a very good reduction of suspended matter and parasites such as helminth eggs, and, significantly lower clogging rates on the filter than are obtained with conventional filtration.

This result is not obvious from prior art which does not recommend the combination of a sedimentation tank and an upwards flowing multi-layer filter, and which requires treatment speeds much lower than those proposed by the invention to obtain a good degree of purification. This result is also contrary to what an expert in the subject would expect, since it is usually accepted that the treatment quality reduces as the treatment speed increases.

According to one preferred variant of the invention, the said process comprises an intermediate step which consists of screening the said water between its outlet from the said sedimentation tank and its inlet into the said filter. The use of this type of screening protects the false bottom of the granular filter, in other words prevents the accumulation of sludge in the space provided in the lower part of the filter under the granular material, into which water is directed from the sedimentation tank. This type of screening can also retain fibers and any other clogging materials that could be contained in the water from the sedimentation tank.

This intermediate step has major advantages compared with screening normally done at the beginning of treatment normally recommended according to the state-of-the-art, it is more economic since it is used on water with a lower content of materials, and can protect the filters more directly even when there is a failure in the sedimentation system.

It would be possible to use the sedimentation tank without the addition of a coagulating agent. In this case, treatment speeds of up to 30 m/h are possible with this system.

However, the sedimentation tank used for the embodiment of the process according to the invention will preferably be a ballasted floc sedimentation tank with at least one coagulating agent. In this case, the treatment speed in the sedimentation tank can be at least 35 m/h. The best choice is a sedimentation tank with lamellar ballasted floc. Under these circumstances, the treatment speed used can be at least 60 m/h and can be up to 200 m/h.

These speeds are much higher than speeds recommended by prior art for this type of installation which, as already mentioned above, does not exceed 20 m/h, even in the case of lamellar ballasted sedimentation tanks.

This type of sedimentation tank is described particularly in the French patents FR 2,627,704 and FR 2,719,734. Therefore, their use within the framework of the process according to the invention can further increase treatment speeds and therefore the compactness of the structures.

Ordinarily, treatment methods involving flocculation-sedimentation are used together with a coagulating reagent injection system designed to quickly and vigorously disperse the reagent in the water to be treated.

Contrary to conventional wisdom in prior art, the applicant recommends that the coagulating reagent should be injected directly into the fast mixing tank in the ballasted floc sedimentation tank in an area where turbulence is low and away from the main currents, or that the reagent should be injected after being very diluted so that the coagulant can be injected in the form of iron or aluminum precipitates composed mostly of hydroxides.

It was found, surprisingly, that the use of this type of injection method could significantly limit or check the elimination of phosphates, without affecting the reduction in suspended matter.

This adaptation of the process is particularly useful in the case of water to be reused for irrigation, such that it maintains a sufficient quantity of phosphates.

In this preferred variant, the possibility of controlling the residual phosphorus as a function of the application type without affecting the reduction in suspended matter, without any limitations on the quantities of added reagents or the very low values of residual phosphorus, is particularly useful.

According to one preferred variant of the method, it comprises an additional step. consisting of injecting at least one flocculating reagent in the said water on the inlet side of the said filter.

According to another preferred variant of the invention, the treatment speed used in the multi-layer granular filter with upwards flow is between 25 m/h and 45 m/h.

According to another aspect of the invention, the filter is washed preferably by passing water output from the sedimentation tank as a backwash through the said filter and then diverting the dirty water current output from the filter. This type of washing can be done without the use of pumps or a filtered wash water storage tank, thus reducing the cost and the complexity of the method.

When it is decided to use several filters in parallel, a filter can be washed using water from the sedimentation tank simply by increasing the water flow through the said filter, and decreasing the flow through one or several other filters.

This type of washing operation can be carried out with concomitant, continuous or intermittent, injection of air into the filter material, in order to improve its efficiency. It would also be possible to systematically, or occasionally, inject a disinfectant such as chlorine in the wash water.

Also according to a variant, the process according to the invention can be used on the inlet side of a biological waste water treatment plant. It can also be used on the outlet side of. a treatment plant, for which it can improve the performances and/or operating conditions.

The invention also relates to an installation for the use of the method described above characterized in that it is composed of the combination of at least one sedimentation tank followed by at least one multi-layer filter with size grading decreasing in the upwards direction of filtration.

Preferably, the installation comprises at least one screen provided between the said sedimentation tank and the said filter with a mesh of between 0.5 and 5 mm, and preferably between 500 $\mu$m and 2 mm.

Advantageously, the said sedimentation tank is a sedimentation tank with ballasted floc, and is preferably lamellar.

According to one variant of the invention, the said multi-layer filter comprises at least one gravel bed in at least one sand bed.

Preferably, the installation also comprises a disinfecting device located on the inlet side of the said filter.

Finally, also preferably, the installation comprises means of extracting at least part of the matter retained during the filtration cycle in the bottom of the said filter, by one or several gravity flushes.

BRIEF DESCRIPTION OF THE DRAWING

The invention and its various advantages will be more easily understood after reading the following description of a non-limitative embodiment of it with reference to the drawings in which:

With reference to FIG. 1, the installation consists of a lamellar type sedimentation tank 1 with ballasted floc, a multi-layer filter 2 with upwards flow and a screen 3 provided between this sedimentation tank and the filter 2.

Figure 1:
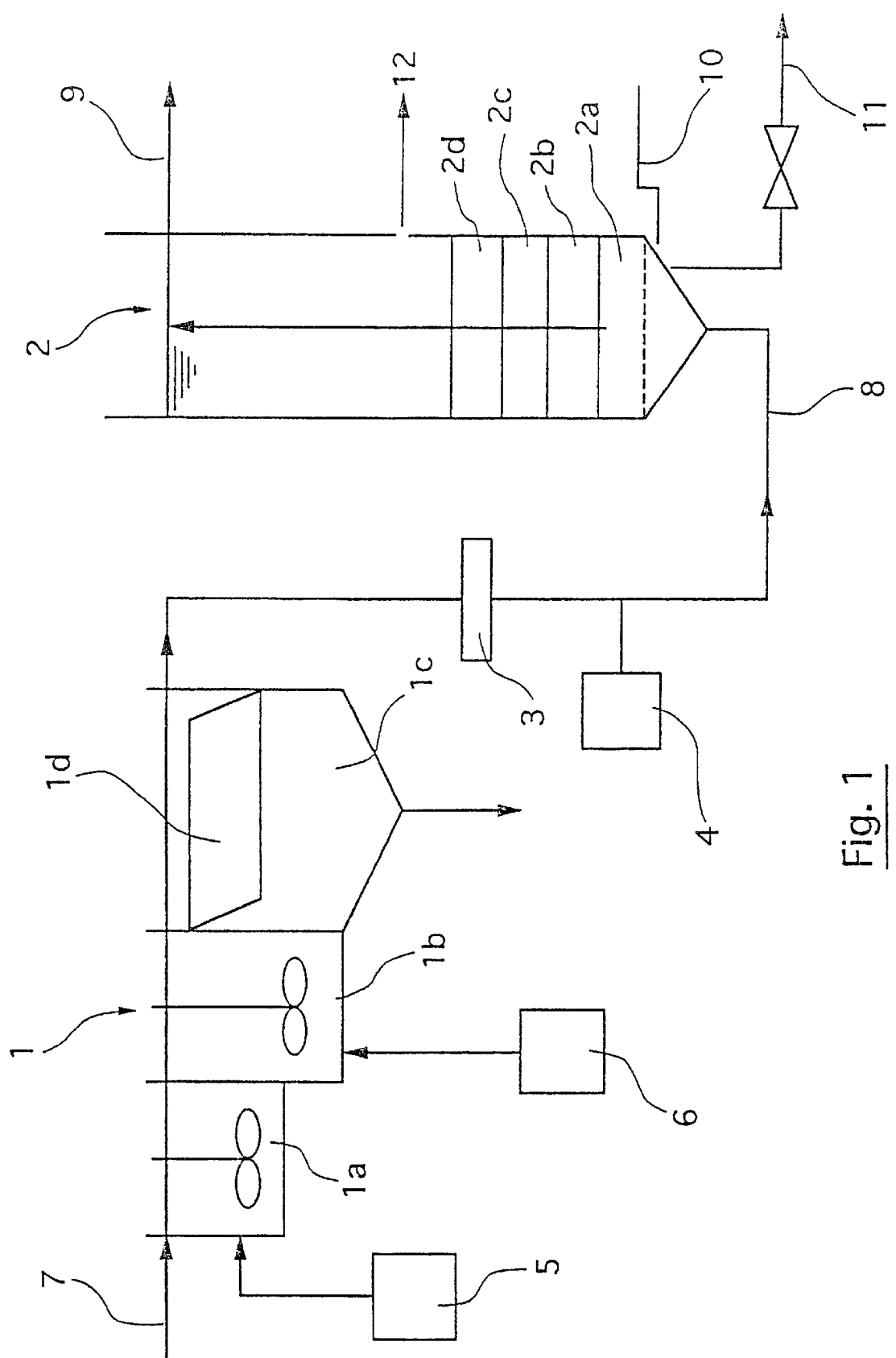
FIG. 1 shows a diagrammatic view of the installation for use of the method according to the invention.

The sedimentation tank 1 with ballasted floc comprises two upstream compartments 1a and 1b and a compartment forming the clarifier 1c provided with inclined strips 1d. Distribution means 5 for a coagulating agent are provided so that this agent can be distributed in compartment 1a and distribution means 6 are provided for a flocculating reagent on compartment 1b.

The multi-layer filter 2 comprises four superposed gravel layers 2a, 2b and sand layers 2c, 2d forming filter materials. Layer 2a is composed of large gravel from 10 to 20 mm diameter, and is 0.2 m thick. Layer 2b is composed of small gravel from 5 to 10 mm diameter and is 0.5 m thick. Layer 2c is composed of coarse sand from 2.5 to 5 mm diameter and is 0.3 m thick. Layer 2d is composed of fine sand from 1.5 to 3 mm diameter and is 0.2 mm thick. Obviously, this is simply one example of the embodiment of the multi-layer filter which in other embodiments could have a different structure without going outside the scope of the invention.

The filter is also provided with water inlet means 8 from the lamellar sedimentation tank with ballasted floc 1 in its lower part and outlet means 9 for the water after it has passed through the filter material provided in the upper part of the filter.. The filter is also provided with air injection means 10 and water evacuation means by gravity flush 11, and wash-water by overflow 12.

The screen 3 provided between the sedimentation tank 1 and the granular filter has a 1 mm mesh.

The installation also preferably has injection means 4 for a disinfectant immediately on the inlet side of the filter.

The filter may easily be washed using clean water from sedimentation tank 1, while discharging dirty water outlet from the filter. The washing efficiency is improved if a disinfecting compound such as chlorine is distributed in the water from the sedimentation tank using injection means 4 and/or using air injection in the filtration material by means 10.

According to this invention, the installation shown was used with a treatment speed in the sedimentation tank of 120 m/h and a treatment speed in the multilayer filter equal to 30 m/h.

Figure 2:
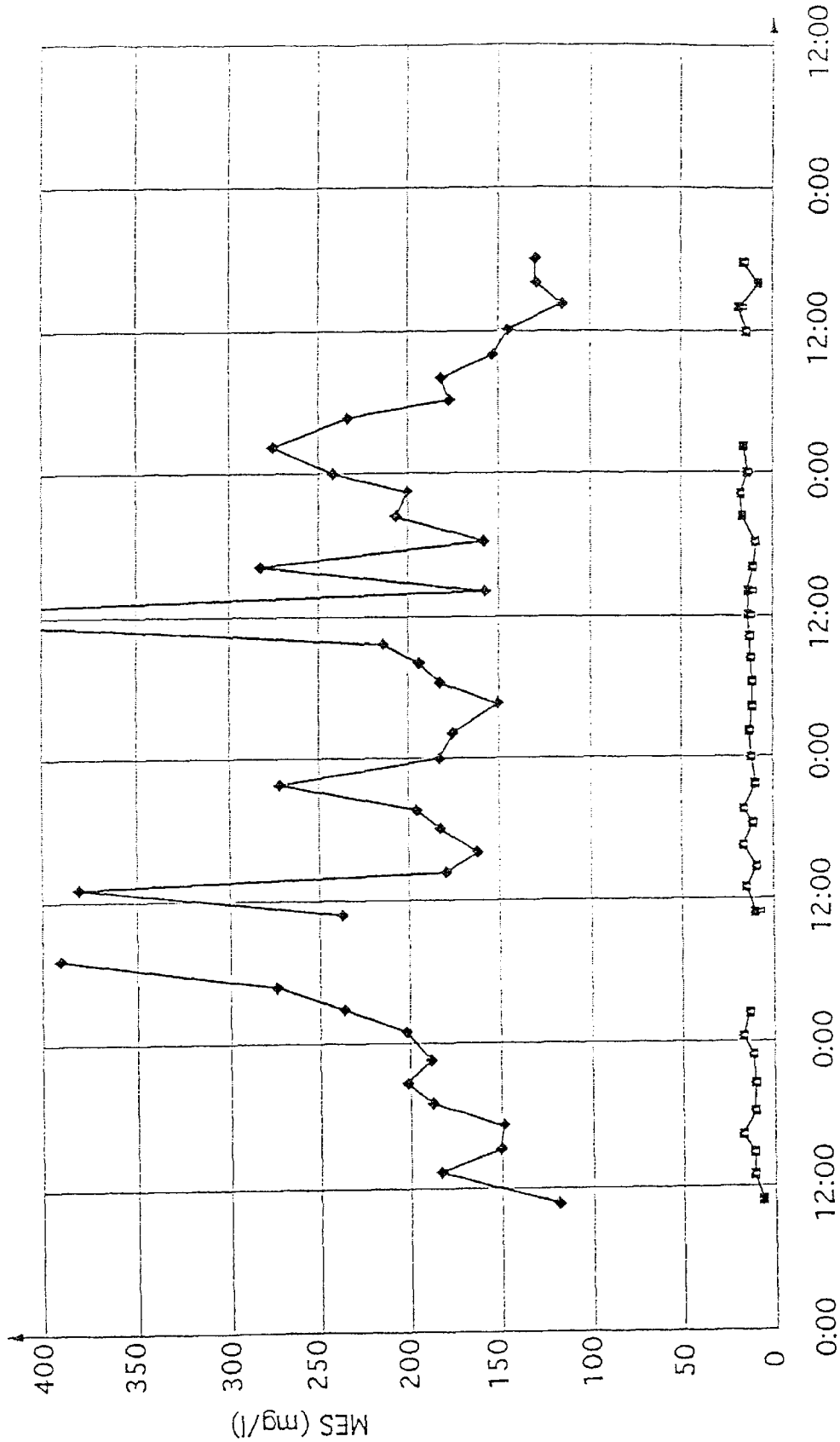
FIG. 2 contains a graph showing curves of reductions in suspended matter obtained according to the invention and, for comparison purposes, obtained with a method not using the multi-layer filter with upwards flow.

The results obtained in reducing suspended matter during 4 days of operation are shown in FIG. 2. This figure shows the content of suspended matter in the water before treatment on the top curve, and the content after treatment according to the invention on the curve on which the measurement points are in the form of triangles.

Comparative tests were carried out on an installation of the type described with reference to FIG. 1, but including a conventional filter with a filtration speed of 10 m/h. The results obtained in reducing suspended matter during four days of operation are also shown in FIG. 2 (curve on which the measurement points are in the form of triangles).

A comparison of these two curves shows that the water qualities obtained are almost identical. Therefore the use of high treatment speeds in the upwards flow multi-layer filter according to the invention has not deteriorated the treatment quality.

Figure 3:
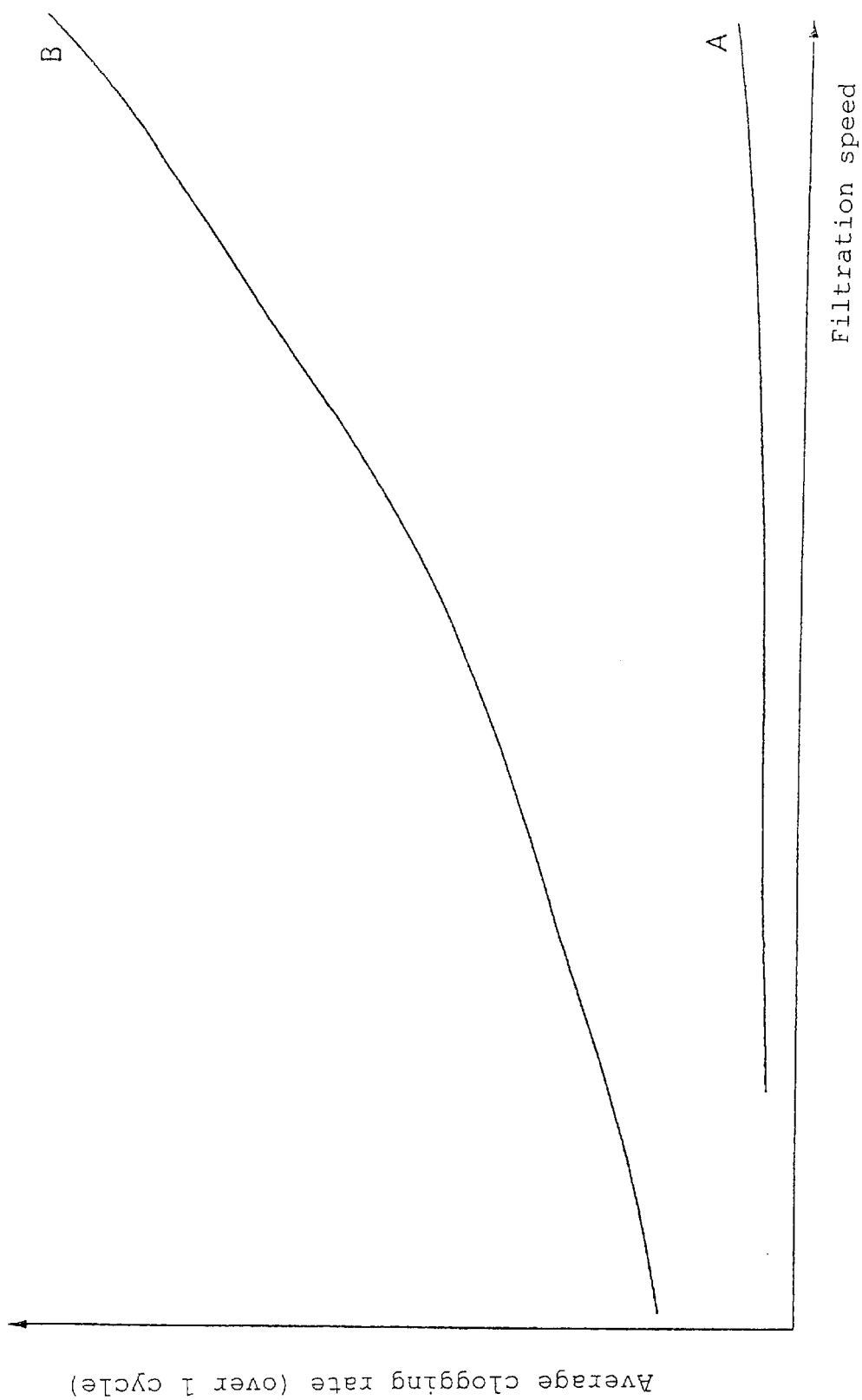
FIG. 3 contains a graph showing clogging curves in the multi-layer filter used for the process according to the invention and in a conventional filter.

FIG. 3 shows the advantage of the invention compared with a conventional solution, concerning the filter clogging rate. Not only does clogging take place much more slowly (between 5 and 10 times slower) according to the invention (see curve A) than in the case of a conventional single layer filter (see curve B), but furthermore clogging does not accelerate when filtration speeds increase, unlike conventional solutions.

Figure 4:
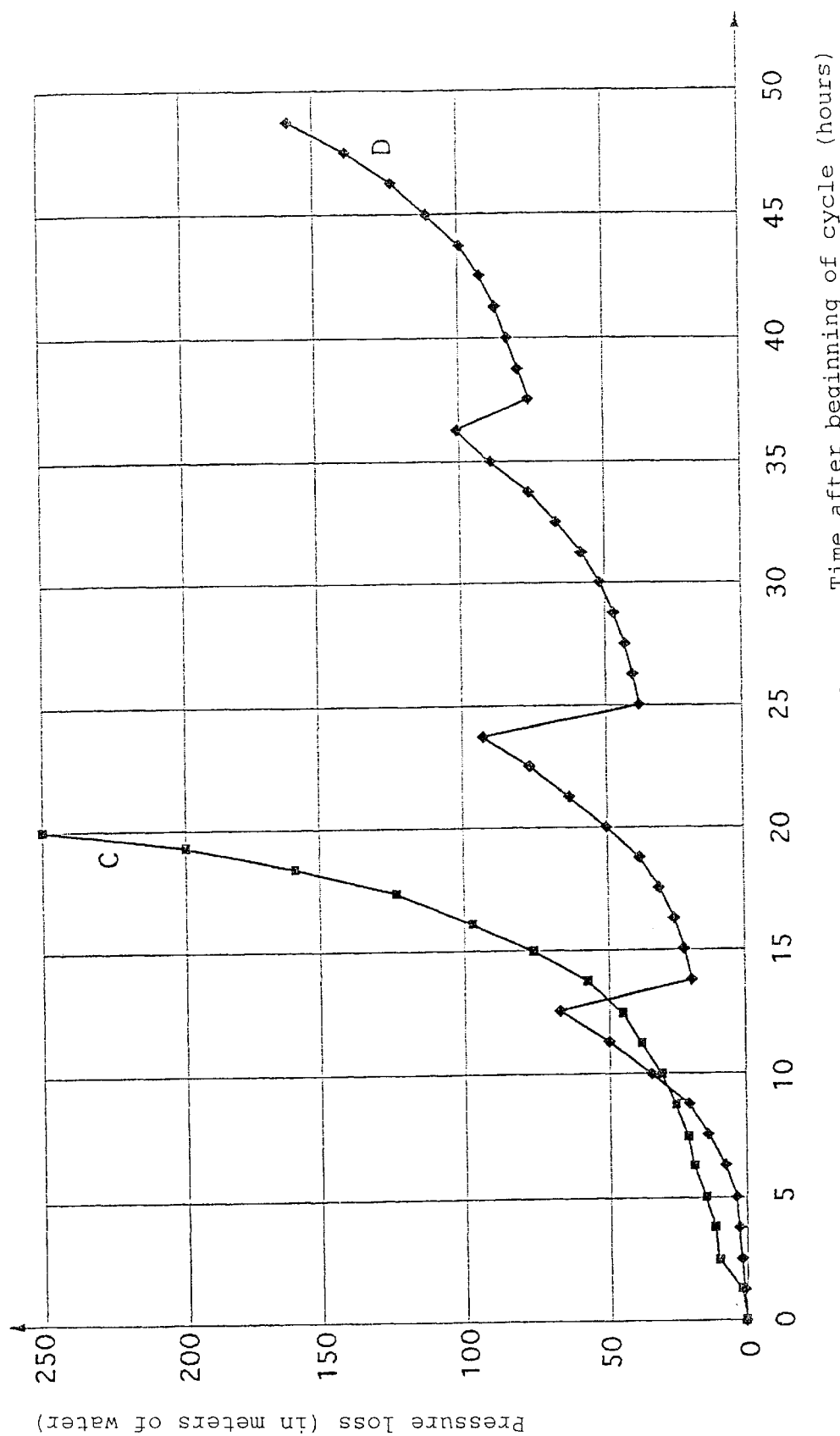
FIG. 4 contains a graph of curves showing the variation of pressure losses in the multi-layer filter used in the method according to the invention and in a conventional filter.

FIG. 4 shows an example of the variation of pressure losses during a cycle for a conventional filter (curve C) and for an upwards flow multi-layer filter (curve D). The significantly slower variation and pressure losses on the multilayer filter and the efficiency of gravity flushes made during the cycle are easily seen.

Note that the plant according to this invention is more compact than state-of-the-art plants. The type of structure used makes it possible to use water in dry weather and in wet weather. Furthermore, reagent doses used in the sedimentation tank can be reduced below the doses necessary when a sedimentation tank only is used.

The embodiment of the invention described herein is not intended to reduce the scope of the invention. Therefore, many modifications may be made to it without going outside the scope of the invention. In particular, it will be possible to add a bank of filters operating in parallel, rather than to use a single filter.

What is claimed is:

1. A method for the treatment of water in order to reduce the content of suspended matter in said water, comprising:
    passing said water through at least one lamellar sedimentation tank at a treatment speed exceeding 20 m/h, wherein said sedimentation tank contains ballasted floc formed by the addition of at least one coagulating agent and one flocculating agent to said water,
    screening said water with a screen having a mesh size between about 0.5 and about 5 mm,
    passing said water upwards through at least one multilayer filter with decreasing size grading at a treatment speed higher than 10 m/h.

2. The method of claim 1 further comprising screening said water following processing in said sedimentation tank and prior to the water passing through said filter.

3. The method of claim 1 wherein the treatment speed of the water passing through the sedimentation tank is at least 80 m/h.

4. The method of claim 1 including utilizing effluent from the multilayer filter for irrigation.

5. The method of claim 1 additionally comprising injecting at least one flocculating reagent in said water on the inlet side of said filter.

6. The method of claim 1 further comprising passing said water through said multi-layer filter with decreasing size grading at a speed of between about 25 m/h and about 45 m/h.

7. The method of claim 1 further comprising backwashing the filter by passing the wastewater treated by the sedimentation tank through the filter and discharging the dirty water from the filter.

8. The method of claim 7 wherein said backwashing additionally comprises injecting air into the filter material.

9. The method of claim 1 including coupling the sedimentation tank and multi-layer filter to a biological wastewater treatment process.

10. The method of claim 1 wherein the mesh size is between about 0.5 and about 2 mm.

11. The method of claim 1 including directing the wastewater through at least one gravel bed and through at least one sand bed formed in the multi-layer filter.

12. The method of claim 1 including locating a disinfecting device on the inlet side of said multiplayer filter and disinfecting the water passing from the sedimentation tank.

13. The method of claim 1 further comprising extracting at least part of the suspended matter retained in said multi-layer filter during a filtration cycle by gravity flushing the filter.

14. A method for treating water in order to reduce the content of suspended matter in said water, comprising: passing the water through at least one lamellar sedimentation tank at a speed exceeding 20 m/h wherein the sedimentation tank contains ballasted floc formed by the addition of at least one coagulating agent and one flocculating agent to the water; directing effluent from the sedimentation tank upwards through at least one multilayer filter with decreasing size grading at a treatment speed higher than 10 m/h interposing a screen having a mesh size between about 0.5 and 5 mm between the sedimentation tank and the multilayer filter and screening the effluent from the sedimentation tank before the effluent is directed through the multilayer filter; and from time to time cleaning the multilayer filter by backwashing the multilayer filter.

15. The method of claim 14 wherein the screen utilized to filter the effluent from the sedimentation tank includes a mesh size of between about 0.5 and about 2 mm.

16. The method of claim 14 wherein the multi-layer filter includes at least one gravel bed and one sand bed and wherein the method includes directing the water upwardly through both the gravel and sand beds.

17. The method of claim 14 including injecting air into the multi-layer filter during the backwashing operation.

18. The method of claim 17 wherein in backwashing the multi-layer filter water is introduced into a top portion of the multi-layer filter and directed downwardly through the multi-layer filter; and wherein the air is injected into a lower portion of the multi-layer filter and directed upwardly through the multi-layer filter during backwashing.

19. The method of claim 14 including injecting a disinfectant into the effluent from the sedimentation tank.

20. The method of claim 14 including utilizing the method in combination with a biological process for treating the water.

21. The method of claim 14 including during certain periods of operation maintaining the speed of the water passing through the sedimentation tank at a speed greater than 60 m/h and during certain periods of operation maintaining the speed of the water moving upwardly through the multi-layer filter at a speed exceeding 25 m/h.

* * * * *